(12) United States Patent
Bohler

(10) Patent No.: US 10,598,318 B1
(45) Date of Patent: Mar. 24, 2020

(54) LIGHT SOURCE AND METHOD FOR MAKING A LIGHT SOURCE

(71) Applicant: Cooper Technologies Company, Houston, TX (US)

(72) Inventor: Christopher Lee Bohler, Peachtree City, GA (US)

(73) Assignee: Eaton Intelligent Power Limited, Dublin (IE)

( * ) Notice: Subject to any disclaimer, the term of this patent is extended or adjusted under 35 U.S.C. 154(b) by 210 days.

(21) Appl. No.: 15/622,373

(22) Filed: Jun. 14, 2017

Related U.S. Application Data

(60) Provisional application No. 62/349,844, filed on Jun. 14, 2016.

(51) Int. Cl.
| | |
|---|---|
| F21K 9/64 | (2016.01) |
| F21V 19/00 | (2006.01) |
| C09D 11/50 | (2014.01) |
| H01L 25/075 | (2006.01) |
| H01L 33/62 | (2010.01) |
| H01L 33/50 | (2010.01) |
| F21Y 115/10 | (2016.01) |
| F21V 23/06 | (2006.01) |
| G06F 17/50 | (2006.01) |

(52) U.S. Cl.
CPC ............. F21K 9/64 (2016.08); C09D 11/50 (2013.01); F21V 19/003 (2013.01); F21V 23/06 (2013.01); G06F 17/5072 (2013.01); H01L 25/0753 (2013.01); H01L 33/504 (2013.01); H01L 33/62 (2013.01); *F21Y 2115/10* (2016.08); *G06F 2217/12* (2013.01); *G06F 2217/40* (2013.01); *H01L 2933/0041* (2013.01); *H01L 2933/0066* (2013.01)

(58) Field of Classification Search
CPC ........ F21K 9/64; F21K 2099/005; F21V 9/38; H01L 25/0753; H01L 33/504
USPC .......................................................... 362/84
See application file for complete search history.

(56) References Cited

U.S. PATENT DOCUMENTS

| | | | | |
|---|---|---|---|---|
| 4,992,704 A | * | 2/1991 | Stinson | H05B 33/0821 315/312 |
| 6,650,044 B1 | * | 11/2003 | Lowery | H01L 33/505 313/498 |
| 7,250,715 B2 | * | 7/2007 | Mueller | C09K 11/0883 313/485 |
| 8,297,783 B2 | * | 10/2012 | Kim | H01L 33/50 362/231 |
| 8,348,457 B2 | * | 1/2013 | Kadotani | F21K 9/00 257/79 |

(Continued)

*Primary Examiner* — William N Harris
(74) *Attorney, Agent, or Firm* — King & Spalding LLP

(57) ABSTRACT

A light source fabrication process to fabricate a customized light source includes attaching a plurality of light emitting diodes to a circuit board, where each light emitting diode is configured to emit light within a same wavelength range. Further, the light source fabrication process includes applying a first phosphor layer to a first set of light emitting diodes of the plurality of light emitting diodes and applying a second phosphor layer to a second set of light emitting diodes of the plurality of light emitting diodes. The phosphor layers are applied to the light emitting diodes using one of a screen printing process and an inkjet printing process. The first phosphor layer is different from and has different optical properties from the second phosphor layer.

9 Claims, 5 Drawing Sheets

(56) References Cited

U.S. PATENT DOCUMENTS

| | | | | |
|---:|---|---|---|---|
| 8,541,802 B2* | 9/2013 | Xu | H01L 33/504 |
| | | | 257/98 |
| 8,735,914 B2* | 5/2014 | Agatani | H01L 25/0753 |
| | | | 257/88 |
| 8,740,413 B1* | 6/2014 | Krames | H01L 25/0753 |
| | | | 257/98 |
| 8,820,950 B2* | 9/2014 | Matsuda | F21K 9/00 |
| | | | 362/231 |
| 8,921,875 B2* | 12/2014 | LeToquin | H01L 33/504 |
| | | | 257/89 |
| 9,275,979 B2* | 3/2016 | Tong | H01L 25/0753 |
| 2013/0257266 A1* | 10/2013 | Ishizaki | H01L 33/504 |
| | | | 313/503 |
| 2015/0334789 A1* | 11/2015 | van de Ven | H05B 33/02 |
| | | | 313/498 |

* cited by examiner

LIGHT SOURCE AND METHOD FOR MAKING A LIGHT SOURCE

CROSS-REFERENCE TO RELATED APPLICATIONS

This application claims priority to U.S. Provisional Patent Application No. 62/349,844 filed Jun. 14, 2016 in the name of Christopher Lee Bohler and entitled "Light Source and Method for Making a Light Source," the entire contents of which are hereby incorporated herein by reference.

STATEMENT REGARDING FEDERALLY SPONSORED RESEARCH OR DEVELOPMENT

This invention was made with government support under Contract Number DE_EE0006260 awarded by the United States Department of Energy. The government has certain rights in the invention.

TECHNICAL FIELD

Embodiments of the technology relate generally to light sources and more specifically to making a light source, for example, a light emitting diode light source.

BACKGROUND

For illumination applications, light emitting diodes offer substantial potential benefit associated with their energy efficiency, light quality, and compact size. However, to realize the full potential benefits offered by light emitting diodes, new technologies are needed. For instance, in a typical production scenario, a circuit board is populated with light emitting diodes of various colors and types that are selected to achieve a pre-determined color prescription. Multiple light emitting diodes of different colors, for example red, green, and blue, may be color-mixed on a circuit board to achieve a desired output that is white or a saturated color output. As another example, multiple light emitting diodes of varying white hues, such as warm white, neutral white, and cool white, can be color-mixed on a circuit board so that their outputs blend together to provide a desired, composite output. As another example, colored light emitting diodes can be mounted on a circuit board with white light emitting diodes so that the colored light emitting diodes shift the composite output in a desired direction, such as adding warmth to a cool white output.

Such conventional light emitting diode manufacturing approaches can have efficiency shortcomings, including having to maintain substantial inventories of various types and colors of light emitting diodes. Further, the conventional light emitting diode manufacturing approaches are not suited to manufacture customized light emitting diode packages and make changeovers on-the-fly to meet specific customer requests. The conventional light emitting diode package manufacturing processes result in a fixed set of light emitting diode packages that generate light having a limited set of pre-determined color temperatures and having a limited set of light emitting diode configurations (e.g., geometric placement). Consequently, an end user of the light emitting diode package, for example, a luminaire manufacturer, is restricted in the choice of color temperature and the shape of light sources that they can offer their customers. That is, if a customer requires a light source that generates light that has a color temperature that is outside of the limited set of pre-determined color temperatures offered by the fixed set of light emitting diode packages, the luminaire manufacturer has no ability to change the light emitting diode package on-demand to meet the requirements of the customer. This in turn limits the autonomy and flexibility of the luminaire manufacturers or other such end users of the light emitting diode package to provide customized lighting solutions to their customers based on their requirement.

Accordingly, improved methods for making light emitting diode light sources are needed. Further need exists for light emitting diode light sources that have improved designs, for example that facilitate efficient manufacturing with the ability to customize at a chip level. A technology addressing such a need, or some related deficiency in the art, would benefit lighting applications.

SUMMARY

In one aspect, the present disclosure is related to a method of fabricating a light source that emits a light having a first color temperature. The method includes attaching a plurality of light emitting diodes to a circuit board. Each light emitting diode is configured to emit light within a same wavelength range. Further, the method includes applying a first phosphor layer to a first set of light emitting diodes of the plurality of light emitting diodes, and applying a second phosphor layer to a second set of light emitting diodes of the plurality of light emitting diodes. The first phosphor layer is different from and has different optical properties than the second phosphor layer. Further, the first phosphor layer is applied to the first set of light emitting diodes and the second phosphor layer is applied to the second set of light emitting diodes using one of a screen printing process and an inkjet printing process. The first set of light emitting diodes with the first phosphor layer applied thereon is configured to generate a first light having a second color temperature, and the second set of light emitting diodes with the second phosphor layer applied thereon is configured to generate a second light having a third color temperature. A combination of the first light and the second light results in the light having the first color temperature.

In another example aspect, the present disclosure is related to a light source configured to emit light having a first color temperature. The light source includes a circuit board and a plurality of light emitting diodes attached to the circuit board. Each light emitting diode is configured to emit light within a same wavelength range. Further, the light source includes a first phosphor coating that is applied on and adheres to a first set of light emitting diodes of the plurality of light emitting diodes, and a second phosphor coating that is applied on and adheres to a second set of light emitting diodes of the plurality of light emitting diodes. The first phosphor coating is applied to the first set of light emitting diodes and the second phosphor coating is applied to the second set of light emitting diodes using one of a screen printing process and an inkjet printing process. Further, the first phosphor coating is different from the second phosphor coating. The first set of light emitting diodes with the first phosphor coating applied thereon generates a first light having a second color temperature, and the second set of light emitting diodes with the second phosphor coating applied thereon generates a second light having a third color temperature. A combination of the first light and the second light results in the light having the first color temperature.

In yet another aspect, the present disclosure is related to a computer readable medium comprising instructions for fabricating a light source that emits a light having a first color temperature. The execution of the instructions by a light source fabrication server causes the light source fabrication server to receive input data comprising customer specifications associated with a fabrication of the light source. Further, the light source fabrication server determines a positioning of a plurality of light emitting diodes on a circuit board based on the customer specifications. Each light emitting diode is configured to emit light within a same wavelength range. Furthermore, the light source fabrication server determines two or more phosphor layers that are to be applied to the plurality of light emitting diodes based on the first color temperature. The two or more phosphor layers include at least a first phosphor layer and a second phosphor layer. The light source fabrication server also selects a first set of light emitting diodes of the plurality of light emitting diodes on which the first phosphor layer is to be applied and a second set of light emitting diodes of the plurality of light emitting diodes on which the second phosphor layer is to be applied. The light source fabrication server generates an output comprising the positioning of the plurality of light emitting diodes on the circuit board, the two or more phosphor layers, the first set of light emitting diodes, and the second set of light emitting diodes. The light source fabrication server transmits the output to a tooling comprising one of a screen printing tooling and an inkjet printing tooling. The tooling is configured to fabricate the light source based on the output.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
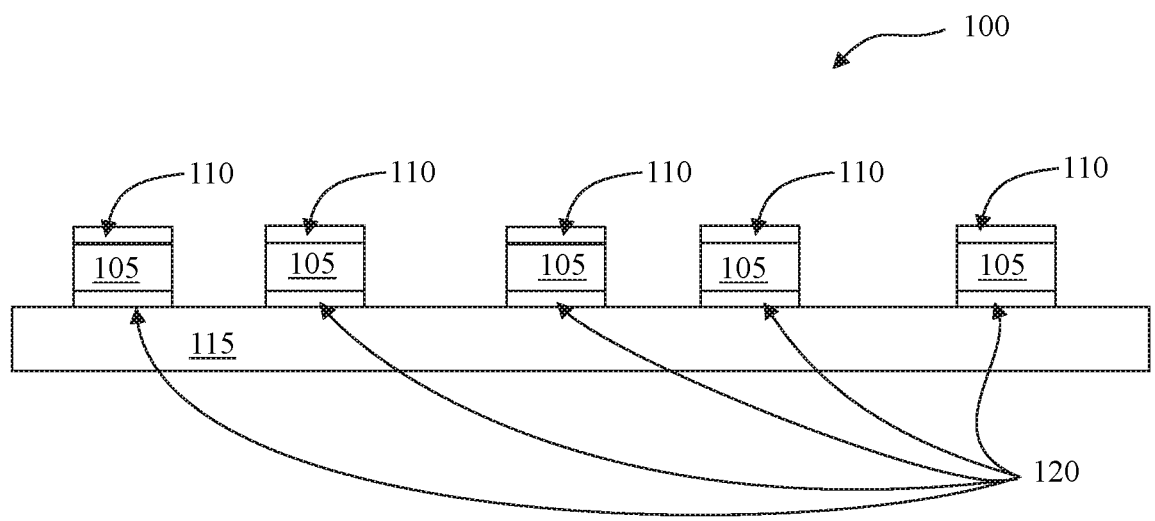
FIG. 1 illustrates a cross sectional view of an example light source that comprises a substrate and an array of light emitting diodes with a first phosphor layer applied thereon, according to some example embodiments of the disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or placements may be exaggerated to help visually convey such principles. In the drawings, similar reference numerals among different figures designate like or corresponding, but not necessarily identical, elements.

DESCRIPTION OF EXAMPLE EMBODIMENTS

The present disclosure describes example light sources and example methods of making the example light sources (herein 'light source fabrication process') by customizing the light source at a chip level. In particular, using the light source fabrication process of the present disclosure, a manufacturer can make a customized light source by applying an in-house process on light emitting diodes procured from a supplier or vendor to meet special requirements of each customer, e.g., specific light color temperature, specific configuration, etc. That is, the manufacturer is not restricted to the limited options provided by the light emitting diode package manufacturer. Further, the light source fabrication process of the present disclosure can support a capability to design a dynamic white point range and associated ratios. The result can significantly simplify an overall inventory and supply chain process. Additionally, the light source fabrication process of the present disclosure allows the manufacturer to "dial-in" a color solution on its manufacturing line, for example to correct a deviation or in connection with loosening a vendor's tolerances. In other words, the light source fabrication process of the present disclosure allows the manufacturer to produce customized light emitting diode light sources based on customer requirements.

In accordance with some example embodiments, the light source fabrication process of the present disclosure may include using a stock of light emitting diodes, e.g., blue light emitting diodes (450-470 nm), to make a light source. In particular, the light emitting diodes may be populated on a circuit board to form a light emitting diode array using standard (for example, FR4 or MCPCB) or non-standard (for example thick-film dielectrics and conductors) manufacturing methodologies. The placement of the each light emitting diode and/or the geometric arrangement of the array of light emitting diodes on the circuit board can be customized based on the customer's requirements associated with the light source. The term 'light emitting diode' as used herein may generally refer to a light emitting diode chip or light emitting diode dye on which phosphor coating may be applied to produce a light source having a customized color temperature output.

Responsive to populating the light emitting diode array on the circuit board, the light source fabrication process may include applying a first phosphor to the populated circuit board using a screen print process, an inkjet printing process, or other appropriate printing processes. In some examples, other processes such as a conformal coat process, a molding process, etc., can be used to apply phosphor on the light emitting diodes that are mounted on the circuit board. In particular, the first phosphor is applied to a first set of light emitting diodes in the array. Then, a second phosphor is applied to a second set of light emitting diodes in the array, again using a screen printing or inkjet printing process. The light source fabrication process may determine the choice of the phosphors, the choice of the colors of each light emitting diode or each set of light emitting diodes, the choice of which light emitting diodes receive which phosphor, etc., based on the customer's requirements associated with the light source.

Further, the light source comprising the array of light emitting diodes and the circuit board are configured to be dynamically controlled. That is, the light source may be configured to separately and electronically control the first set of light emitting diodes and the second set of light emitting diodes by varying current ratio, current modulation ratio, etc., to the two sets of light emitting diodes to provide a controlled white point. That is, the resulting light source can comprise a color-mixed solution that can be dynamically controlled to provide the controlled white point. Alternatively, the light source comprising the array of light emitting diodes and the circuit board may be configured to be statically controlled to provide a white light output. Further, it is noted that the choice of the phosphors, the choice of the colors of each light emitting diode or each set of light emitting diodes, the choice of which light emitting diodes receive which phosphor, etc., may be determined based on the customer's requirements associated with the light source.

A light source that can be dynamically controlled (interchangeably referred to as 'dynamically controlled light source') as described herein may generally refer to a light source where one or more characteristics of a current (e.g., intensity, modulation, ratios, etc.) that is supplied to the individual light emitting diodes or each set of light emitting diodes of the light source can be separately and electronically controlled to adjust one or more light output characteristics of the light source. For example, a dynamically controlled light source may include an array of light emitting diodes where a first set of light emitting diodes are configured to output light having a color temperature of 3000K, a second set of light emitting diodes are configured to output light having a color temperature of 4000K, and a third set of light emitting diodes are configured to output light having a color temperature of 5000K. In said dynamically controlled light source, current may be individually supplied to each set of light emitting diodes and characteristics of said current may be separately and electronically controlled (e.g., changed) to adjust the color temperature of the combined light output of the light source. That is, in said dynamically controlled light source, a combined light output having any range of color temperatures between 3000K-5000K may be obtained by varying the current ratio between each set of light emitting diodes, current modulation ratio of the current supplied to each set of light emitting diodes, etc. In contrast, a light source that is statically controlled (interchangeably referred to as 'statically controlled light source') as described herein may generally refer to a light source where a same current is supplied to all the light emitting diodes in an array of light emitting diodes to generate a light output having color temperature that cannot be dynamically varied as in the case of the dynamically controlled light source.

Even though the present disclosure describes a light source having a first set of light emitting diodes having a first phosphor applied thereon and a second set of light emitting diodes having a second phosphor applied thereon, one of ordinary skill in the art can understand and appreciate that the light source can have more sets of light emitting diodes, each set having a different or the same phosphor applied thereon without departing from a broader scope of the present disclosure. For example, the light source can include upwards of five to six sets of light emitting diode arrays, each having a different phosphor applied thereon and each generating light having a different color temperature. The light from the different sets of light emitting diodes may combine or average out to form a combined output light that appears as a white light to the human eye. Further, even though the present disclosure describes a first phosphor being applied to a first set of light emitting diodes and a second phosphor being applied to a second set of light emitting diodes, one of ordinary skill in the art can understand and appreciate that in other example embodiments, multiple layered phosphor solutions can be applied over the light emitting diodes in the array to tailor the output to a specific CIE x, y value (i.e., color mix and luminance value from a color space defined by the International Commission on Illumination (CIE)) or spectral content.

Example embodiments of the light source and the light source fabrication process will be described more fully hereinafter with reference to the accompanying drawings that describe representative embodiments of the present technology. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

Turning now to FIG. 1, this figure illustrates a cross sectional view of an example light source 100 that comprises a substrate 115 and an array of light emitting diodes 105 according to some example embodiments of the disclosure. The light source 100 can be incorporated in a luminaire or lighting system to provide illumination for an area or space, such as in overhead lighting, a streetlight, or another appropriate application.

In an example embodiment, the substrate 115 comprises a circuit board. The circuit board can comprise an FR4 circuit board, a MCPCB circuit board, or a circuit board that utilizes thick-film dielectrics, for example. As illustrated, the substrate 115 comprises conductive traces 120 that supply electricity to the light emitting diodes 105. The conductive traces 120 can comprise printed metallic lines and metallic pads on a circuit board, for example.

As illustrated, a layer 110 containing one or more phosphor materials (phosphors) covers each of the light emitting diodes 105. In an example embodiment, each of the light emitting diodes 105 comprises a discrete light emitting diode or chip that is attached to the substrate 115. The diodes 105 can comprise a one-dimensional array or a two-dimensional array, for example.

Some example embodiments of the light source 100 illustrated in FIG. 1 can be fabricated via soldering or otherwise attaching the light emitting diodes 105 to the substrate 115 to form a unit. The light source fabrication process can proceed by processing the unit to apply the phosphor layer 110 to the light emitting diodes 105. Thus, the phosphor layer 110 can be applied after the light emitting diodes 105 are attached to the substrate 115.

In some example embodiments, the phosphor layer 110 is applied via screen-printing, inkjet printing, or other appropriate printing processes. In this manner, all or selected ones of the light emitting diodes 105 can be selectively coated with the phosphor layer 110.

In some example embodiments, each of the light emitting diodes 105 is manufactured to or otherwise procured under a common specification. For example, the light emitting diodes 105 can be specified as generating blue light in a range of 450-470 nm. That is, using the light source fabrication process described herein, all the different light sources can be fabricated using light emitting diodes having a common specification, e.g., light emitting diodes having wavelength of 450-470 nm (blue color), which in turn reduces the inventory that needs to be maintained and managed.

In operation, the light emitting diodes 105 can emit blue light that the phosphor layer 110 converts into one or more desired colors or spectral ranges. For example, the phosphor layer 110 can comprise a mix of different phosphors that converts the blue light into white light for illumination in a streetlight, overhead lighting fixture, or other luminaire.

Figure 2:
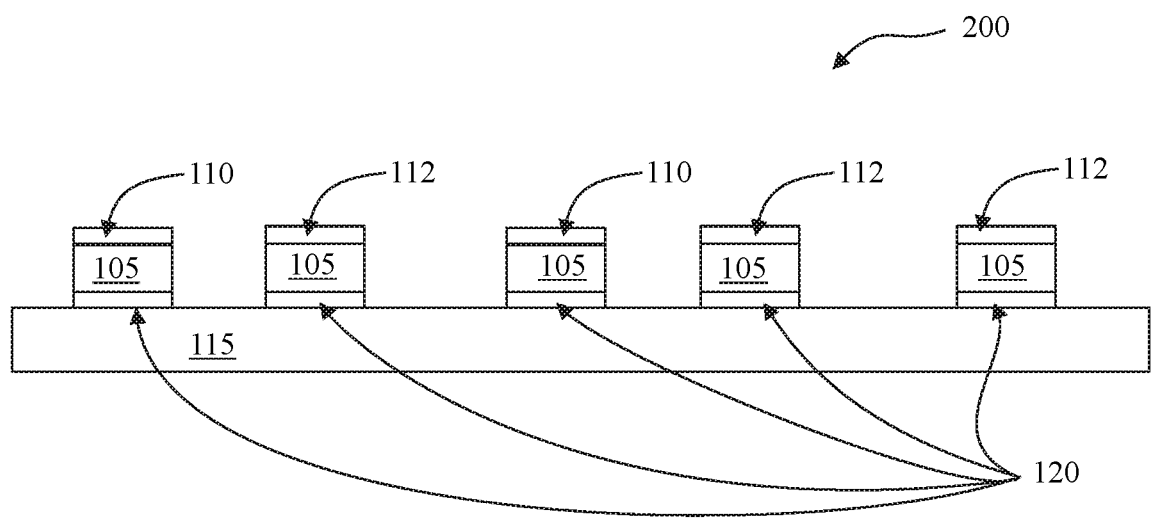
FIG. 2 illustrates a cross sectional view of another example light source that comprises a substrate and an array of light emitting diodes where the first phosphor layer is applied on a first set of light emitting diodes and a second phosphor layer is applied on a second set of light emitting diodes, according to some example embodiments of the disclosure.

Turning now to FIG. 2, this figure illustrates a cross sectional view of another example light source 200 according to some example embodiments of the disclosure. The illustrated light source 200 comprises an array of light emitting diodes 105 attached to a substrate 115 like the light source 100 illustrated in FIG. 1 and discussed above. However, in the light source 200 of FIG. 2, the light emitting diodes 105 have two different phosphor layers 110, 112. As illustrated, certain selected light emitting diodes 105 have the phosphor layer 110, while other selected light emitting diodes 105 have the phosphor layer 112. In this example embodiment, the two different phosphor layers 110, 112 have different spectral properties. Thus, each layer 110, 112 converts light into a different spectral range.

In some embodiments, the layers 110, 112 generate white light of different hues. In some embodiments, one of the layers 110, 112 generates white light, while the other layer 110, 112 generates red light or light of some other color. In such an embodiment, a luminaire that incorporates the light source 200 can emit illumination that is blended from the white and red light, resulting in warming the white light.

The light source 200 can be fabricated by first attaching the light emitting diodes 105 to the substrate 115 to create a unit. The phosphor layer 110 can be selectively applied to a first set of the attached light emitting diodes 105, as discussed above. The phosphor layer 112 can be selectively applied to a second set of the attached light emitting diodes 105. The term 'set' as used herein refers to a non-empty set.

Figure 3:
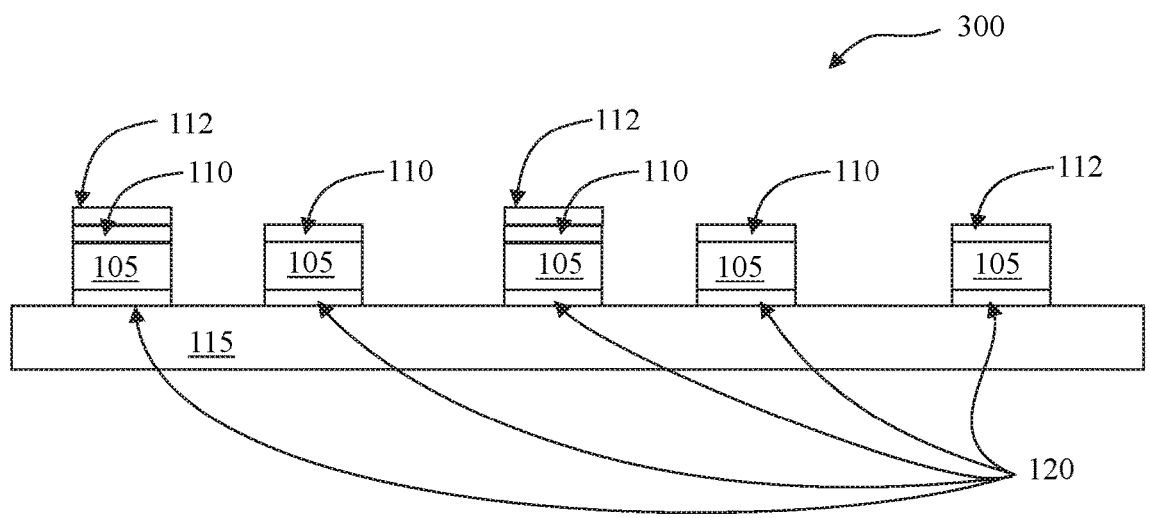
FIG. 3 illustrates a cross sectional view of yet another example light source that comprises a substrate and an array of light emitting diodes where both the first phosphor layer and the second phosphor layer are applied on the array of light emitting diodes, according to some example embodiments of the disclosure.

In the illustrated embodiment of FIG. 2, the two sets are mutually exclusive. In other embodiments, the sets may overlap. Thus, some selected light emitting diodes 105 may receive both phosphor layers 110, 112. FIG. 3 illustrates an example of such an embodiment where a first phosphor layer 110 and a second phosphor layer 112 are applied to each of the light emitting diodes 105. Even though FIG. 3 illustrates the second phosphor layer 112 being applied on top of the first phosphor layer 110, one of ordinary skill in the art can understand and appreciate that in other example embodiments, the first phosphor layer 110 may be applied on top of the second phosphor layer 112 without departing from a broader scope of the present disclosure. Alternatively, in yet another example embodiment, the first phosphor layer 110 may be applied to a portion of a light emitting diode 105 and the second phosphor layer 112 may be applied to a remainder portion or another portion of the light emitting diode 105 without departing from a broader scope of the present disclosure.

Further, as described above, it is noted that even though the present disclosure describes a light source having two sets of light emitting diodes 105 and two phosphor layers (110, 112), one of ordinary skill in the art can understand and appreciate that the light source fabrication process can make a light source having any appropriate number of light emitting diode sets where any appropriate number of phosphor layers may be applied to the light emitting diode sets without departing from a broader scope of the present disclosure. For example, the light source fabrication process can make a light source having 'x' number of light emitting diodes, where each light emitting diode has a different phosphor layer applied thereon or multiple phosphor layers applied thereon, i.e., 'x' phosphor layers based on a color temperature requirement for the light output by the light source.

Furthermore, even though the present disclosure describes the phosphor layers being applied precisely to each light emitting diode, one of ordinary skill in the art can understand and appreciate that in some example embodiments, the phosphor layers may be sweepingly applied across the board, i.e., such that it coats the light emitting diodes and the substrate in between or on either side of the light emitting diodes.

Figure 4:
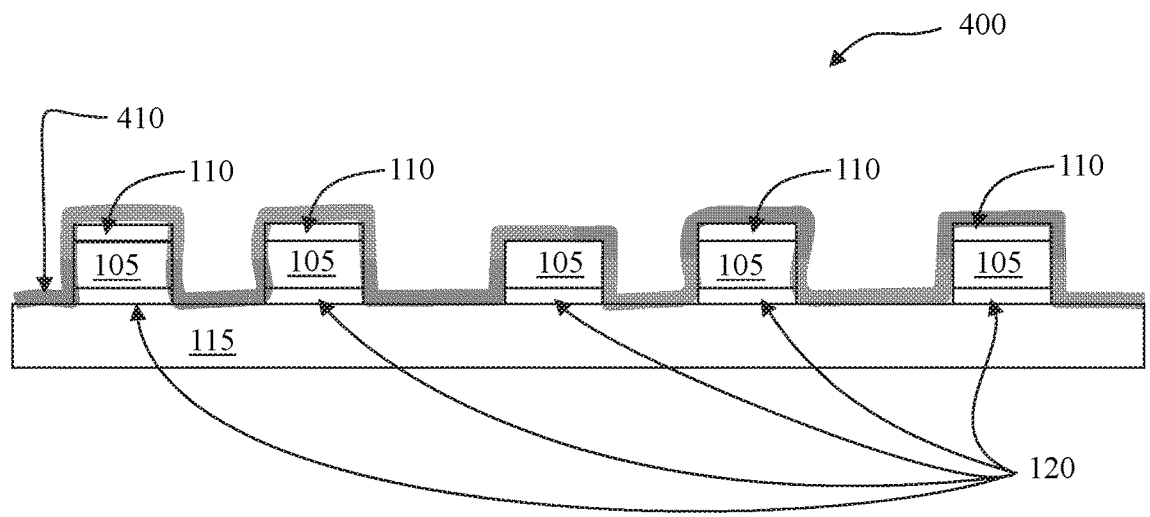
FIG. 4 illustrates a cross-sectional view of another example light source that comprises a substrate and an array of light emitting diodes where a first phosphor layer is applied on the array of light emitting diodes and a conformal phosphor coating is applied to the light emitting diodes and the substrate, according to some example embodiments of the disclosure.
Figure 5:
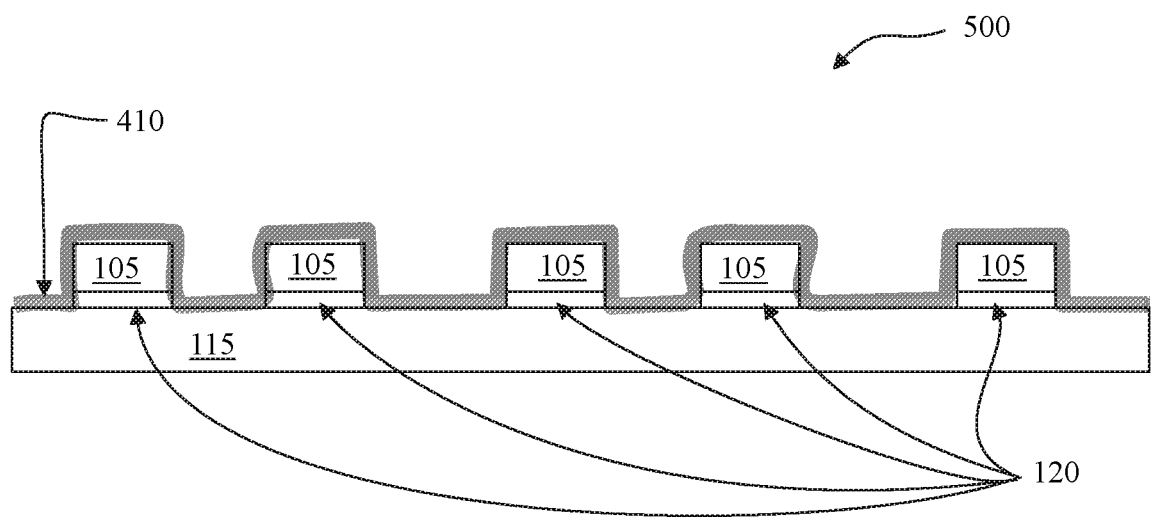
FIG. 5 illustrates a cross-sectional view of another example embodiment in which the conformal phosphor coating is the only phosphor coating applied to the array of light emitting diodes and the substrate, according to some example embodiments of the disclosure.
Figure 6:
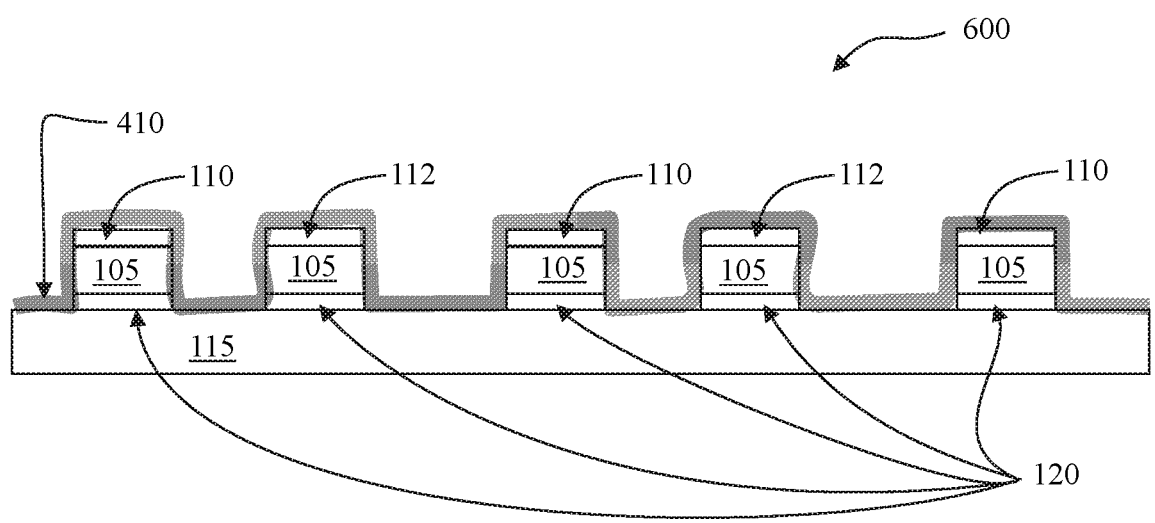
FIG. 6 illustrates a cross-sectional view of another example embodiment in which the first and second phosphor layers are respectively applied to selected subsets of the light emitting diodes and a conformal coating is applied to the array of light emitting diodes and the substrate, according to some example embodiments of the disclosure.

Turning to FIG. 4-6, in some example embodiments, as illustrated in FIG. 4, a conformal coating 410 that comprises one or more phosphor types is applied over all of the light emitting diodes 105 and the substrate 115 to which the light emitting diodes are attached. In the illustrated embodiment, selected light emitting diodes 105 have an additional phosphor layer 110 that is between the conformal phosphor coating 410 and the associated light emitting diodes 105. As illustrated in FIG. 4, the conformal coating 410 may be applied directly on top of the light emitting diodes 105 and/or on top of a phosphor layer (e.g., first phosphor layer 110) that has already been applied to the light emitting diodes 105. In other example embodiments, as illustrated in FIG. 5, the conformal phosphor coating 410 is the only phosphor coating applied to the light emitting diodes 105 and the substrate 115. In yet other example embodiments, as illustrated in FIG. 6, the phosphor layers 110, 112 are respectively applied to selected subsets of the light emitting diodes 105 as discussed above. Then, the conformal coating 410 is applied to the unit.

Figure 7:
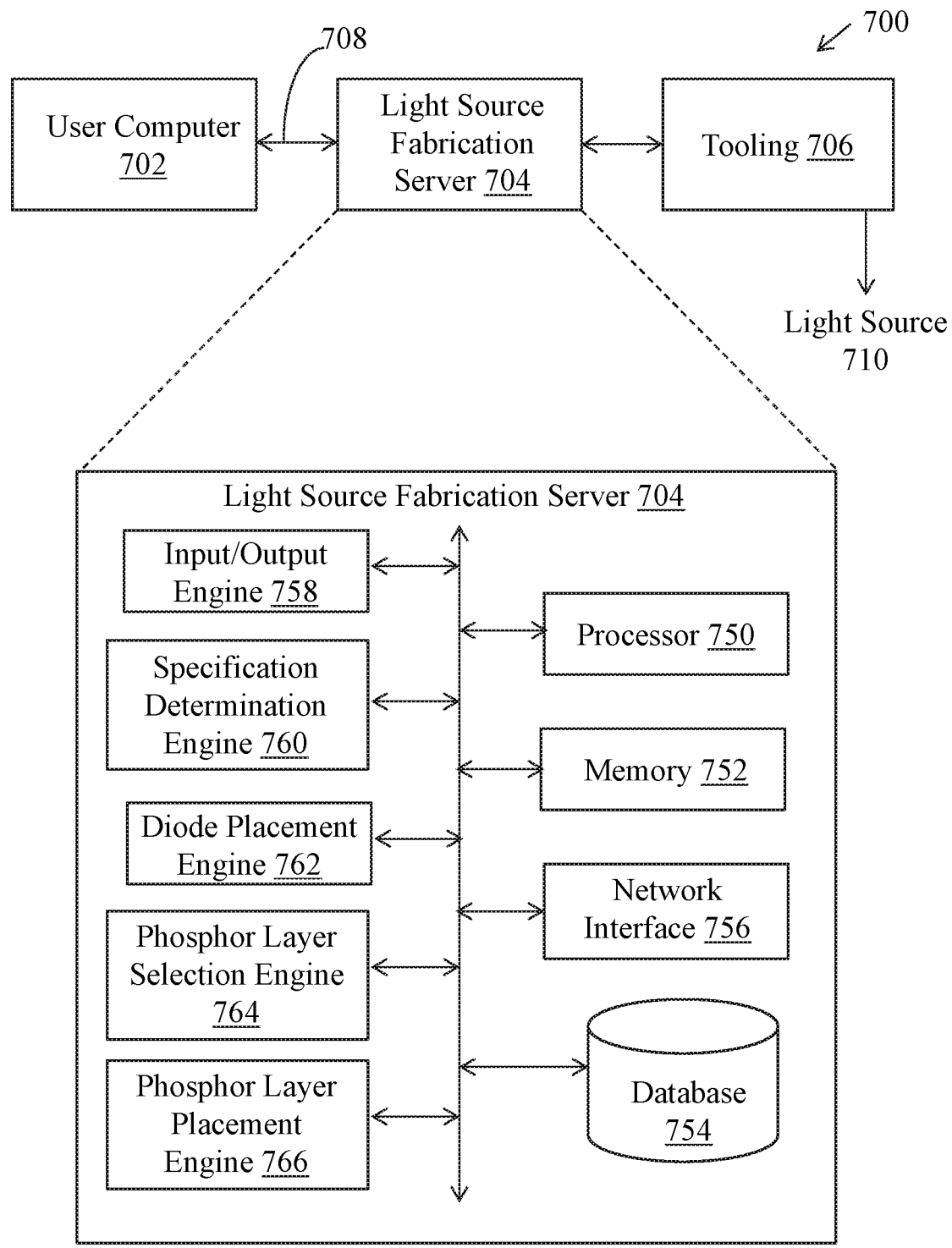
FIG. 7 illustrates an example light source fabrication system, according to some example embodiments of the disclosure.

Turning to FIG. 7, this figure illustrates an example light source fabrication system 700. In particular, the light source fabrication system 700 includes a user computer 702, a light source fabrication server 704, and a tooling 706. In one example embodiment, the user computer 702 may be remotely located from and communicably coupled to the light engine fabrication server 704 via a communication network 708 and over a wired or wireless communication link established with the network interface 756 of the light source fabrication server 704. Alternatively, in another example embodiment, the user computer 702 may be located adjacent to or in a vicinity of the light source fabrication engine 704. The user computer 702 may be configured to electronically feed inputs to the light source fabrication server 704 in the form of data files that are in a format that is compatible with the light source fabrication server 704. In some example embodiments, the light source fabrication server 704 may include a user interface for directly feeding inputs to the light source fabrication server 704. In said example embodiments, the user computer 702 may be omitted. The inputs that are fed to the light source fabrication server 704 may include, but are not limited to, customer specifications associated with the light source that the customer desires and/or feedback from either the fabrication line, the manufacturer, or the customer regarding the finished light source. The granularity of the input can vary from a detailed list of specifications from the customer to an application and/or an environment in which the customer intends to use the finished light source. For example, the input may include specific color temperature details, lumen output, specific light emitting diode array configuration details, number of light emitting diode details, and/or details regarding the placement of each light emitting diode as provided by the customer. Alternatively, in another example, the input can include a type of application of the finished light source, such as, plant-centric horticultural lighting for assisting a photosynthesis process, human-centric outdoor lighting, indoor lighting in a grocery store environment, etc.

Upon receiving the input, one or more components of the light fabrication engine server 704, e.g., a processor 750, a memory 752, engines (758-766), and/or a database 754, may operate in concert to process the input and generate one or more outputs for the tooling 706. Example outputs can include, but are not limited to, instructions to the tooling regarding the type of phosphor layers, the placement of the phosphor layers, the placement of the light emitting diodes, desired color temperature of the light output by the finished light source, etc. The tooling 706 is configured to make the light source (e.g., 100, 200, 300, 400, 500, and/or 600, hereinafter 'light source 710') using light emitting diodes procured from vendors or suppliers and based on the received instructions from the light source fabrication server 704. As described above in the present disclosure, the tooling 706 may include a screen printing tool, an inkjet printing tool, or other appropriate printing tools.

The operations of the light source fabrication system 700 are described in greater detail below in association with FIG. 8. In particular, FIG. 8, includes a flowchart that illustrates the operations of the light source fabrication server 704. Although specific operations are disclosed in the flowchart illustrated in FIG. 8, such operations are exemplary. That is, embodiments of the present invention are well suited to performing various other operations or variations of the operations recited in the flowchart. It is appreciated that the operations in the flowchart illustrated in FIG. 8 may be performed in an order different than presented, and that not all of the operations in the flowchart may be performed.

Figure 8:
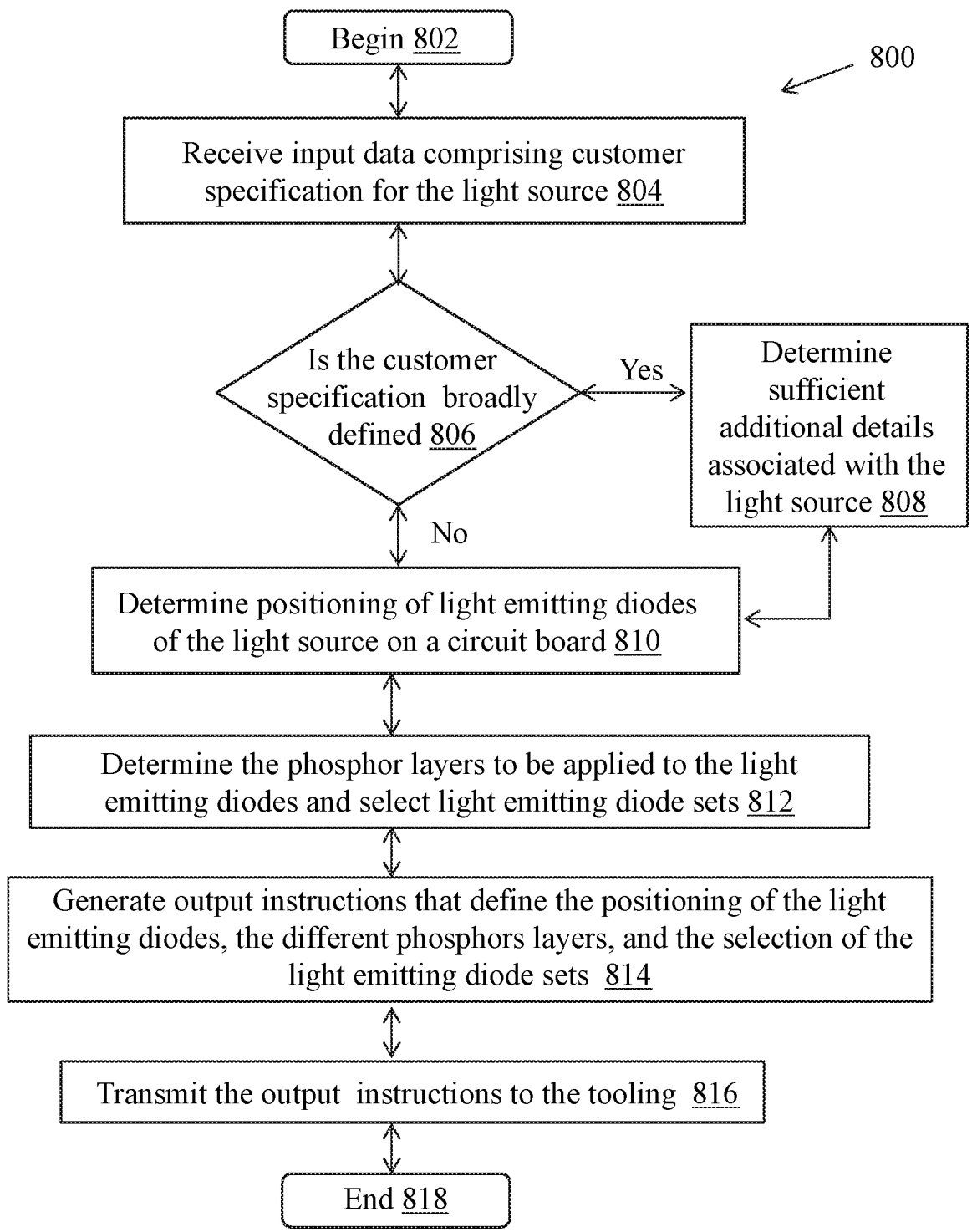
FIG. 8 is a flowchart that illustrates an example operation of the light source fabrication server, according to some example embodiments of the disclosure.

All, or a portion of, the embodiments described by the flowchart illustrated in FIG. 8 can be implemented using computer-readable and computer-executable instructions which reside, for example, in computer-usable media of a computer system or like device. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the light source fabrication server 704 to provide instructions to a tooling 706 that fabricates the light source 700 as described below.

The light source fabrication process 800 begins at operation 802 where input data regarding the specifications of a light source 710 is provided to the light source fabrication server 704 using either the user computer 702 or a user interface (not shown) of the light source fabrication server 704. The manufacturer may receive said specifications associated with the light source 710 from a customer. As described above, in one example, the specifications provided by the customer may include details of one or more parameters associated with the light source 710, such as, color temperature, lumen output, geometric configuration of the light emitting diodes, schematics, etc., whereas, in another example, the specification provided by the customer may be very broad, such as, the application and environment in which the light source is to be used. In either case, upon receiving the specifications, the manufacturer electronically feeds the input data to the light source fabrication server 704 in the form of an input data file. In some example embodiments, the input data provided to the light source fabrication server 704 may include feedback from a fabrication line in the factory, the customer, and/or the manufacturer based on the finished light source. For example, the input data can include errors or deviations in the finished light source that need to be addressed 'on the fly'.

In operation 804, the input/output engine 758 of the light source fabrication server 704 receives the input data. Responsively, in operation 806, the input/output engine 758 may transmit the input data to the specification determination engine 760. Upon receiving the input data, in operation 806, the specification determination engine 760 may determine if the specification is defined broadly. If the specification is defined broadly, e.g., only the application and/or environment of intended use of the light source 710 is provided, then, in operation 808, the specification determination engine 760 may operate in concert with the database 754 and/or other external data sources to determine sufficient additional details associated with the light source. The sufficient additional details may be determined based on the information in the input data. Sufficient addition details as described herein may include minimum specification details that are needed to fabricate a light source which meets the customer's requirements. In some example embodiments, the sufficient additional details may include at least a color temperature of the light source and a geometric configuration of the array of light sources. For example, if the only specification provided in the input data is that the light source is to be used in a luminaire that is intended to illuminate a product display shelf in a showroom, the specification determination engine 760 may operate in concert with the database 754 and/or external data sources to determine: (a) that the light source should have light emitting diodes in a linear two-dimensional array arrangement, (b) the color temperature of the output light (e.g., cool white light), (c) the light source should be rectangular and specific dimensions of the light source, etc.

The database 754 may include specifications of one or more light sources for each application and/or environment of intended use of the light sources, different phosphor layer details and phosphor layer mixing details for achieving different color temperatures, geometric arrangement details of the light emitting diodes for each application and/or environment of intended use of the light sources, etc. The external data sources may augment the data provided in the database 754.

Responsive to receiving sufficient additional details associated with the light source, the light source fabrication process 800 proceeds to operation 810. Similarly, in operation 806, if the specification determination engine 760 determines that the specification provided in the input data comprises sufficient detail to fabricate the light source 710 that meets the customer's requirements, then the light source fabrication process 800 proceeds to operation 810 without executing operation 808.

In operation 810, the specification determination engine 760 operates in concert with the diode placement engine 762, the external data sources, and the database 754 to determine where the light emitting diodes 105 are to be placed or positioned on the circuit board 115 and an overall geometric configuration of the final array of light emitting diodes 105 on the circuit board 115. The determination of where the light emitting diodes 105 are to be positioned on the circuit board 115 and an overall geometric configuration of the final array of light emitting diodes 105 on the circuit board 115 may be determined based on the specification in the input data and/or the sufficient additional data. For example, the diode placement engine 762 may determine that the light emitting diodes should be placed in a circular configuration, linear configuration, or any other appropriate geometric or non-geometric configuration. Additionally, in said example, the diode placement engine 762 may also determine the exact coordinates on the circuit board 115 where the light emitting diodes 105 are to be placed.

Further, in operation 812, the phosphor layer selection engine 764 and the phosphor layer placement engine 766 may operate in concert to determine: (a) the phosphor layers (110, 112, and/or 410) that are to be applied to the light emitting diodes 105 on the circuit board 115, and (b) the mapping between the light emitting diodes 105 and the phosphor layers (110, 112, and/or 410) that are to be applied on the light emitting diodes. In other words, the phosphor layer placement engine 766 selects a first set of light emitting diodes to receive a coating of a first phosphor layer 110, a second set of light emitting diodes to receive a coating of a second phosphor layer 112, and so on. The determination of the phosphor layers (110, 112, and/or 410) that are to be applied to the light emitting diodes 105 may be based on a color temperature specified by the customer for the light emitted by the light source 710. Further, the selection of the light emitting diode sets for applying specific phosphor layers (110, 112, and/or 410) may be based on a criteria that no one color should stand out in the light emitted by the light source. In some example embodiments, the phosphor layer placement engine 766 may use a randomizer algorithm, such as a random number generator, to randomly select light emitting diodes 105 to apply specific phosphor layers (110, 112, 410) such that no one color is clustered or stands out in the light emitted by the light source 710. In other example embodiments, any other appropriate logic may be used to assign phosphor layers to the light emitting diodes 105 such that no one specific color would stand out in the light emitting by the light source 710.

Responsive to determining the light emitting diode positioning, the light emitting diode array geometry, the phosphor layers to be applied to the light emitting diodes, and selecting the light emitting diodes sets for applying the phosphor layers, in operation 814, the input/output engine 758 may generate output instructions for transmission to the tooling 706 to fabricate the light source 710 that meets the customer's requirements. The output instructions may include coordinate positions to place the light emitting diodes 105 on the circuit board 115, the geometric configuration of the light emitting diode array on the circuit board 115, the different phosphor layers (110, 112, and/or 410) to be applied to the light emitting diodes 105, and/or the selection of light emitting diode sets (e.g., first phosphor layer on first set of light emitting diodes, and second phosphor on second set of light emitting diodes 105). After generating the output instructions, in operation 816 the input/output engine 758 electronically transmits the instructions as signals to the tooling 706. The signals may be transmitted electrically or wirelessly to the tooling 706. The operation of the light source fabrication server 704 ends in operation 818.

The tooling 706 may fabricate the light source 710 based on the signals/instructions received from the light source fabrication server 704. If any errors are detected in the light source 710 or if adjustments are needed, said errors or adjustments may be fed back to the light source fabrication server 704 to generate output instructions to the tooling 706 for making necessary modifications 'on the fly' to fix or address the errors or adjustments.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A method of fabricating a light source that emits a light having a first color temperature comprising the steps of:
    attaching a plurality of light emitting diodes to a circuit board, wherein each light emitting diode is configured to emit light within a same wavelength range, and wherein the plurality of light emitting diodes comprises a first set of light emitting diodes and a second set of light emitting diodes that are arranged on the circuit board such that the first set of light emitting diodes and the second set of light emitting diodes are unpartitioned;
    applying a first phosphor layer to the first set of light emitting diodes of the plurality of light emitting diodes, wherein the first set of light emitting diodes with the first phosphor layer applied thereon generate a first light having a second color temperature; and
    applying a second phosphor layer to the second set of light emitting diodes of the plurality of light emitting diodes, wherein the second set of light emitting diodes with the second phosphor layer applied thereon generate a second light having a third color temperature;
    wherein the first phosphor layer is different from and has different optical properties than the second phosphor layer,
    wherein a combination of the first light and the second light results in the light having the first color temperature, and
    wherein the first phosphor layer is applied to the first set of light emitting diodes and the second phosphor layer is applied to the second set of light emitting diodes using one of a screen printing process and an inkjet printing process.

2. The method of claim 1, further comprising: applying a conformal coating comprising one or more phosphor types to the circuit board and/or the plurality of light emitting diodes.

3. The method of claim 1, further comprising: applying the second phosphor layer over the first phosphor layer on the first set of light emitting diodes.

4. The method of claim 1, further comprising: applying the first phosphor layer over the second phosphor layer on the second set of light emitting diodes.

5. The method of claim 1, wherein the circuit board comprises an FR4 circuit board.

6. The method of claim 1, wherein the circuit board comprises an MCPCB circuit board.

7. The method of claim 1, wherein the circuit board comprises a thick film circuit board.

8. The method of claim 1, wherein the wavelength range is 450 nm to 470 nm.

9. The method of claim 1, wherein the plurality of light emitting diodes are blue light emitting diodes.

* * * * *